UNITED STATES PATENT OFFICE 2,087,030

PROCESS OF MAKING ANHYDRIDES OF MONOCARBOXYLIC ACIDS

Harry Le B. Gray and Thomas F. Murray, Jr., Rochester, N. Y., assignors, by mesne assignments, to Eastman Kodak Company, Jersey City, N. J., a corporation of New Jersey No Drawing. Application November 20, 1934, Serial No. 753,926

8 Claims. (Cl. 260—123)

This invention relates to the manufacture of organic acid anhydrides, and particularly to the manufacture of the anhydrides of monocarboxylic acids whose molecular weight is considerably higher than that of acetic acid. One object of the invention is to provide a process for making these anhydrides cheaply and easily. Another object is to provide a process for making them in the presence of considerable amounts of water. Other objects will hereinafter appear.

While the anhydrides of the monocarboxylic acids of relatively high molecular weight, such, for instance, as benzoic anhydride, lauric anhydride, furoic anhydride, etc., have been known, their preparation has been rather difficult and costly. For the most part, it has been necessary to prepare them under anhydrous conditions.

We have discovered that the anhydrides of monocarboxylic acids of relatively high molecular weight, such, for instance, as the anhydrides of the aromatic monocarboxylic acids, the higher aliphatic monocarboxylic acids, and the heterocyclic monocarboxylic acids, can be prepared by treating the corresponding acid chloride with an aqueous solution of trisodium phosphate. The time of the reaction may be shortened by the addition of finely divided copper. In some cases the reaction will start without external heating. In other cases, a little warming may be necessary.

We give below several examples of the method of carrying out our process. It will be understood, however, that these examples are purely illustrative, and that we are not to be limited by them, except as indicated in the appended claims.

*Benzoic anhydride.*—To a solution of 38 g. (0.1 gram-mol) of trisodium phosphate,

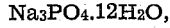

in 100 cc. of water, warmed to about 50–60° C., is added 43 g. (0.3 gram-mol) of benzoyl chloride and the mixture is shaken for from 15 to 30 minutes. During this time the solution cools somewhat or may be cooled, solid separates, and the liquid becomes acid in its reaction to litmus. It is neutralized with 10% sodium hydroxide solution and the solid filtered off. This is dissolved in ether and the ether solution extracted with sodium bicarbonate solution until there is no more evolution of carbon dioxide. The ether is dried over solid calcium chloride and the calcium chloride is filtered off. The ether is evaporated leaving crude benzoic anhydride which melts at 38–41° C. After a single recrystallization from benzene and ligroin, pure white crystals are obtained, whose melting point is 41–42° C.

The time of the reaction may be shortened by the addition of a trace of finely divided copper.

*Lauric anhydride.*—19 g. (0.05 gram-mol) of trisodium phosphate is dissolved in 75 cc. of water, and to this solution is added 33 g. (0.15 gram-mol) of lauryl chloride. The mixture becomes somewhat warm upon shaking. A solid separates and the solution becomes acid. Sufficient 10% sodium hydroxide solution is added to render the solution strongly alkaline to phenolphthalein. Water is added, and the solution is extracted with ether. The ether is distilled off, and the residual oil crystallizes on cooling. The melting point of the crystals obtained in a representative run was 37.5° C. The melting point of lauric anhydride is 41° C., and that of lauric acid is 43.6° C. In order to identify the product definitely, some of the crystals were added to a small amount of alcoholic sodium hydroxide. They did not neutralize it readily, indicating that the crystals were lauric anhydride rather than lauric acid. Further, an attempt was made to extract a solution of sodium laurate with ether. No extraction occurred, showing that the product extracted by ether from the alkaline reaction mixture was not lauric acid, but lauric anhydride.

The time of the reaction may be shortened by the addition of a trace of copper powder.

*Furoic anhydride.*—13 g. (1/30 gram-mol) of trisodium phosphate is dissolved in 75 cc. of water. To this solution is added 13 g. (0.1 gram-mol) of furoyl chloride. The mixture is warmed occasionally for short periods of time, to a temperature not to exceed 60° C., and allowed to stand at room temperature. After a considerable length of time, a solid separates, and the solution is found to be acid. The solution is made alkaline with 10% sodium hydroxide solution and the solid is filtered off. The dried residue is dissolved in ether, and the solution filtered. The product obtained on crystallization melts at 71–72° C. The melting point of furoic anhydride is given in the literature as 73° C. Furoic acid melts at 132.6–134.3° C., and sublimes at 100° C.

The reaction time may be shortened by the addition of a trace of finely divided copper.

While we have given certain specific examples of the preparation of acid anhydrides by our novel process, it will be understood that we are to be limited neither by the conditions and proportions given therein, nor to the specific anhydrides mentioned. The process is unusual in that it is applicable to the manufacture of the anhydrides of all monocarboxylic acids of relatively high molecular weight, that is, those monocarboxylic acids containing five or more carbon atoms. For instance, when an attempt is made to prepare the anhydrides of the lower aliphatic monocarboxylic acids, namely acetic, propionic and butyric anhydrides, by our process, it is found that the reaction is difficult to control.

What we claim as our invention and desire to secure by Letters Patent of the United States is:

1. A process of preparing the anhydrides of the monocarboxylic acids of five or more carbon atoms, comprising treating the corresponding acid chloride with an aqueous solution of trisodium phosphate, and isolating the acid anhydride formed.

2. A process of preparing the anhydrides of the monocarboxylic aromatic acids, comprising treating the corresponding acid chloride with an aqueous solution of trisodium phosphate, and isolating the acid anhydride formed.

3. A process of preparing the anhydrides of the higher aliphatic monocarboxylic acids, comprising treating the corresponding acid chloride with an aqueous solution of trisodium phosphate, and isolating the acid anhydride formed.

4. A process of preparing the anhydrides of the heterocyclic monocarboxylic acids, comprising treating the corresponding acid chloride with an aqueous solution of trisodium phosphate, and isolating the acid anhydride formed.

5. A process of preparing benzoic anhydride, comprising treating benzoyl chloride with an aqueous solution of trisodium phosphate and isolating the benzoic anhydride formed.

6. A process of preparing lauric anhydride, comprising treating lauryl chloride with an aqueous solution of trisodium phosphate and isolating the lauric anhydride formed.

7. A process of preparing furoic anhydride, comprising treating furoyl chloride with an aqueous solution of trisodium phosphate, and isolating the furoic anhydride formed.

8. A process of preparing the anhydrides of the monocarboxylic acids of five or more carbon atoms, comprising treating the corresponding acid chloride with an aqueous solution of trisodium phosphate in the presence of finely divided copper, and isolating the acid anhydride formed.

HARRY LE B. GRAY.
THOMAS F. MURRAY, Jr.